United States Patent [19]

Hinton et al.

[11] Patent Number: 5,428,811

[45] Date of Patent: Jun. 27, 1995

[54] INTERFACE BETWEEN A REGISTER FILE WHICH ARBITRATES BETWEEN A NUMBER OF SINGLE CYCLE AND MULTIPLE CYCLE FUNCTIONAL UNITS

[75] Inventors: Glenn J. Hinton, Portland, Oreg.;
Frank S. Smith, Chandler, Ariz.;
Randy Steck, Aloha, Oreg.

[73] Assignee: Intel Corporation, Santa Clara, Calif.

[21] Appl. No.: 233,230

[22] Filed: Apr. 26, 1994

Related U.S. Application Data

[63] Continuation of Ser. No. 630,496, Dec. 20, 1990, abandoned.

[51] Int. Cl.$^6$ ............................................. G06F 9/30
[52] U.S. Cl. ................................. 395/800; 395/375
[58] Field of Search .......................... 395/800, 375

[56] References Cited

U.S. PATENT DOCUMENTS

| | | | |
|---|---|---|---|
| 4,891,753 | 1/1990 | Budd et al. | 395/375 |
| 5,073,855 | 12/1991 | Staplin et al. | 395/375 |
| 5,142,631 | 8/1992 | Murray et al. | 395/375 |
| 5,185,872 | 2/1993 | Arnold et al. | 395/375 |

OTHER PUBLICATIONS

Hinton, 3/1989, "80960–Next Generation" COMPCON Spring 89, IEEE.

McGeady, 3/90, "The I960CA Super scatar implementation of 80960 Architecture" COMPCON Spring 90, IEE.

Ryan, 6/88, "Intel's 80960: An Architecture Optimized for Embedded Control" IEE.

Andrews; "Intel RISC processors give UME boards a performance boost"; Computer Design; 11/89; pp. 38–39.

McGeady, "A Programmer's View of The 80960 Architecture" 3/89 COMPCON Spring 89, IEEE.

Primary Examiner—Alyssa H. Bowler
Assistant Examiner—L. Donaghue
Attorney, Agent, or Firm—Owen L. Lamb

[57] ABSTRACT

An interface protocol between a microprocessor register file (6) and a plurality of first functional units capable of independently executing first microinstructions that take a plurality of clock cycles to complete execution. A plurality of second functional units capable of independently executing second microinstructions that take a single clock cycle to complete execution. The first and second microinstructions are issued by an instruction decoder. A microintruction bus (112) is connected to the instruction decoder, the register file, and to each of the first and second functional units. A REG interface and a destination bus (110) are also connected to the register file (6). A Scbok line (102) is connected between the instruction unit, the register file and to each one of the first and second functional units. The instruction decoder includes means for asserting the Scbok line to signal that a current microinstruction on the microintruction bus (112) is valid. Means in the register file disassert the Scbok signal upon the condition that any one register in the register file needed by the instruction on the microinstruction bus is busy. An EU write line (102) connected from one of the single cycle functional units to the multiple cycle functional units is asserted by one of the single cycle functional units upon the condition that the single cycle functional unit requests access to the destination bus. The multiple cycle functional units and single cycle functional units are connected to the REG interface and to the destination bus. Arbitration means (3) in each of the multiple cycle functional units respond to the EU write line and to the Scbok line to prevent access to the destination bus upon the condition that the EU write line and the Scbo k line are asserted.

13 Claims, 4 Drawing Sheets

INTERFACE BETWEEN A REGISTER FILE WHICH ARBITRATES BETWEEN A NUMBER OF SINGLE CYCLE AND MULTIPLE CYCLE FUNCTIONAL UNITS

REFERENCES TO RELATED APPLICATIONS

This application a continuation of U.S. patent application 07/630,496 filed Dec. 20, 1990, now abandoned. This application is related to the following patents and patent applications: U.S. Pat. No. 5,185,872, Ser. No. 07/486,407, filed Feb. 28, 1990, granted to Arnold et al. on Feb. 9, 1993; U.S. Pat. No. 5,023,844, Ser. No. 07/486,408, filed Feb. 28, 1990, granted to Arnold et al. on Jun. 11, 1991; and patent applications "Data Bypass Structure in a Microprocessor Register File to Ensure Data Integrity", Ser. No. 07/488,254, filed Mar. 5, 1990 now abandoned; "An Instruction Decoder That Issues Multiple Instructions in Accordance with Interdependencies of the Instructions" Ser. No. 07/630,536 now abandoned; "An Instruction Pipeline Sequencer With a Branch Lookahead and Branch Prediction Capability That Minimizes Pipeline Break Losses" Ser. No. 07/630,535 now abandoned; "Instruction Fetch Unit in a Microprocessor That Executes Multiple Instructions in One Cycle and Switches Program Streams Every Cycle" Ser. No. 07/630,498 now abandoned; "A Pipelined Microprocessor in which Multiple Functions are Performed During Each Pipeline Stage" Ser. No. 07/630,499 published as an H document No. H001291 ; "A Pipeline Sequencer With Alternate IP Selection when a Branch Lookahead Prediction Fails" Ser. No. 07/686,479 now abandoned ; "An Instruction Decoder Having Multiple Alias Registers Which Provide Indirect Access in Microcode to User Operands" Ser. No. 07/630,497 now U.S. Pat. No. 5,222,244; "A High Bandwidth Output Hierarchical Memory Store Including a Cache, Fetch Buffer and ROM" Ser. No. 07/630,534 now U.S. Pat. No. 5,313,605; all assigned to Intel Corporation.

BACKGROUND OF THE INVENTION

1. Field of the Invention

The invention relates to data processing systems and more particularly to a pipelined microprocessor employing a method and apparatus for interfacing a number of multicycle functional units with a register file such that multiple, multicycle operations take place concurrently.

2. Description of the Related Art

The above-referenced copending patent application Ser. No. 07/630,499 describes a pipelined microprocessor in which multiple functions are performed during each pipeline stage. The microprocessor has a memory coprocessor connected to a MEM interface and a register coprocessor connected to a REG interface. The REG interface and MEM interface are connected to independent read and write ports of a register file. An Instruction Sequencer is connected to an independent write port of the register file, to the REG interface and to the MEM interface. An Instruction Cache supplies the instruction sequencer with at least two instruction words per clock. Single-cycle coprocessors and a multiple-cycle coprocessors are connected to the REG and MEM interfaces. The Instruction Sequencer decodes incoming instruction words from the Cache, and issues up to three instructions on the REG interface, the MEM interface, and/or the branch logic within the Instruction Sequencer.

In U.S. Pat. No. 4,891,753 "Register Scoreboarding on a Microprocessor Chip" by David Budde, et al., granted on Jan. 2, 1990 and assigned to Intel Corporation, there is described apparatus for minimizing idle time when executing an instruction stream in a pipelined microprocessor by using a scoreboarding technique. A microinstruction is placed on a microinstruction bus and a microinstruction valid line is asserted. When a load microinstruction is decoded, a read operation is sent to a bus control logic, the destination register is marked as busy, and execution proceeds to the next current microinstruction. The marking provides an indication as to whether a current instruction can be executed without interfering with the completion of a previous instruction. The marking of registers gives rise to the term "scoreboarding". Execution of the current microinstruction proceeds provided that its source and destination registers are not marked "busy"; otherwise the microinstruction valid line is unasserted immediately after the current microinstruction appears on the microinstruction bus. The current microinstruction is thereby cancelled and must be reissued. When data is returned as the result of a read operation, the destination registers are marked as "not busy".

The above-referenced copending patent application Ser. No. 07/486,407 extends this prior scoreboarding technique to encompass all multiple cycle operations in addition to the load instruction. This is accomplished by providing means for driving a Scbok line to signal that a current microinstruction on the microinstruction bus is valid. Information is then driven on the machine bus during the first phase of a clock cycle. The source operands needed by the instruction are read during the second phase of the clock cycle. The resources needed by operands to execute the instruction are checked to see if they are not busy. The Scbok signal is asserted upon the condition that any one resource needed by the instruction is busy. Means are provided to cause all resources to cancel any work done with respect to executing the instruction to thereby make it appear to the rest of the system that the instruction never was issued. The instruction is then reissued during the next clock cycle.

The above-referenced copending patent applications Ser. No. 07/486,408 and Ser. No. 07/488,254 describe a random access (RAM) register file having multiple independent read ports and multiple independent write ports that provide the on-chip registers to support multiple parallel instruction execution. It also checks and maintains the register scoreboarding logic as described in Ser. No. 07/486,407. The register file contains the macrocode and microcode visible RAM registers. The register file provides a high performance interface to these registers through a multi-ported access structure, allowing four reads and two writes on different registers to occur during the same machine cycle. This register file provides a structure that allows multiple parallel accesses to operands which allows several operations to proceed in parallel.

The above-described patent applications disclose a Reduced Instruction Set Computer (RISC) architecture that achieves greater speed in the form of increased throughput (number of completed tasks per unit of time) and increased speed (reduced time it takes to complete a task). The described microprocessor can issue and execute an instruction per clock cycle and provides a large number of registers on chip.

To take full advantage of the architecture, a processor should be organized so that it has the ability to add application specific modules to meet different user applications and it should be able to execute multiple instructions in one clock cycle while concurrently doing loads and branches.

It is therefore an object of the present invention to provide an interface between the on chip register file and the various functional units connected the register file such that results produced by instructions issued to the functional units can be returned in any arbitrary order to the register file.

SUMMARY OF THE INVENTION

Briefly, the above object is accomplished in accordance with the invention by providing an interface protocol between a microprocessor register file and a plurality of first functional units capable of independently executing first microinstructions that take a plurality of clock cycles to complete execution and a plurality of second functional units capable of independently executing second microinstructions that take a single clock cycle to complete execution, the first and second microinstructions being issued by an instruction decoder. A microintruction bus is connected to the instruction decoder, the register file, and to each of the first and second functional units. A REG (register) interface, a destination bus are also connected to the register file. The multiple cycle functional units and single cycle functional units are connected to the REG interface and to the destination bus. A Scbok (scoreboard OK) line is connected between the instruction decoder, the register file and to each one of the first and second functional units. The instruction decoder includes means for asserting the Scbok line to signal that a current microinstruction on the microintruction bus is valid. Means in the register file disassert the Scbok signal upon the condition that any one register in the register file needed by the instruction on the microinstruction bus is busy. An EU write line connected from one of the single cycle functional units to the multiple cycle functional units is asserted by one of the single cycle functional units upon the condition that the single cycle functional unit requests access to the destination bus. Arbitration means in each of the multiple cycle functional units respond to the EU write line and to the ScbOk line to prevent access to the destination bus upon the condition that the EU write line and the ScbOk line are asserted.

The invention has the advantage that the various functional units connected the register file are able to return results produced by instructions executed by them in any arbitrary order to the register file.

BRIEF DESCRIPTION OF THE DRAWINGS

The foregoing and other objects, features, and advantages of the invention will be apparent from the following more particular description of a preferred embodiment of the invention as illustrated in the accompanying drawings.

DESCRIPTION OF THE PREFERRED EMBODIMENT

Figure 1:
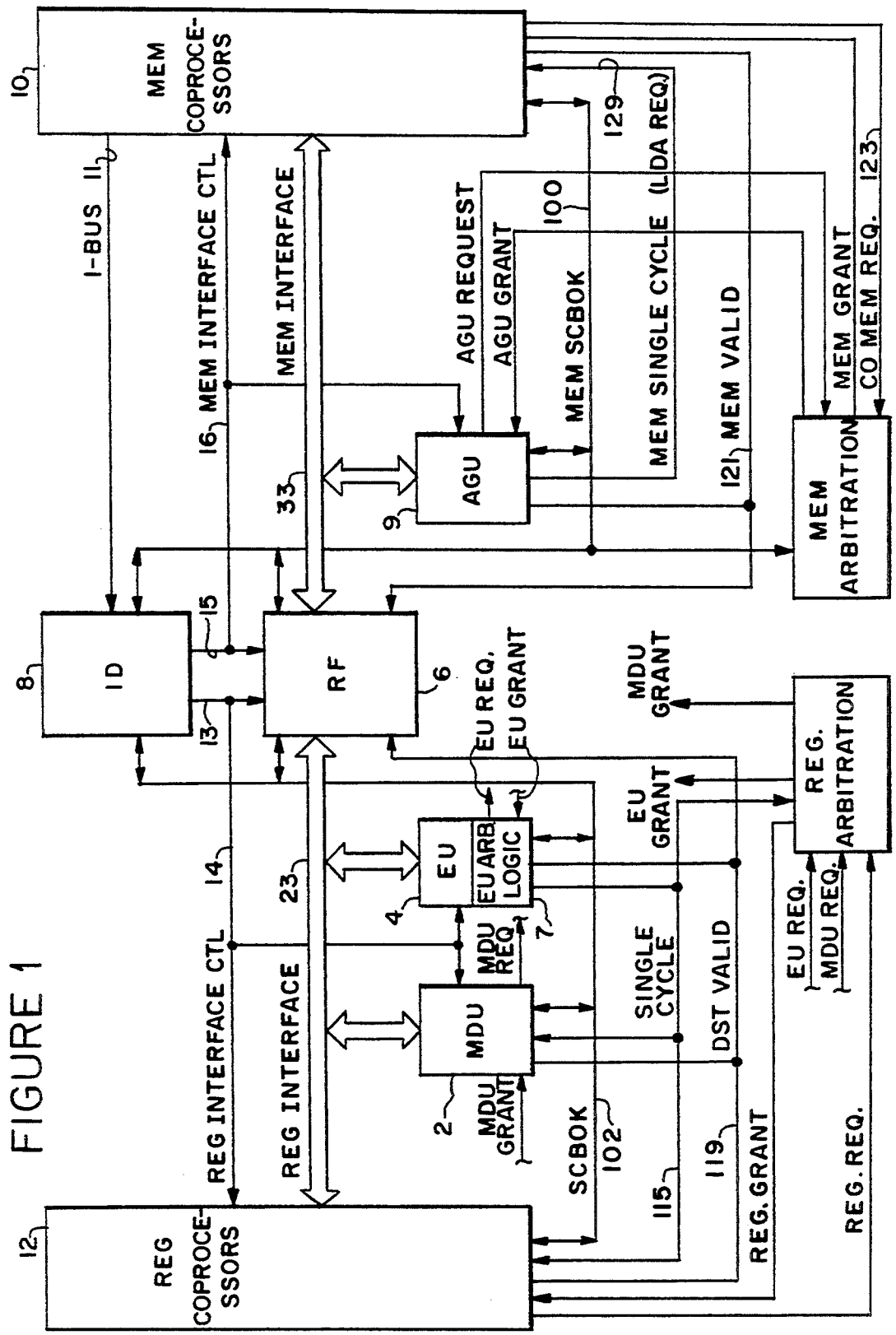
FIG 1 is a functional block diagram of each of the major components of the microprocessor in which the invention is embodied.
Figure 2:
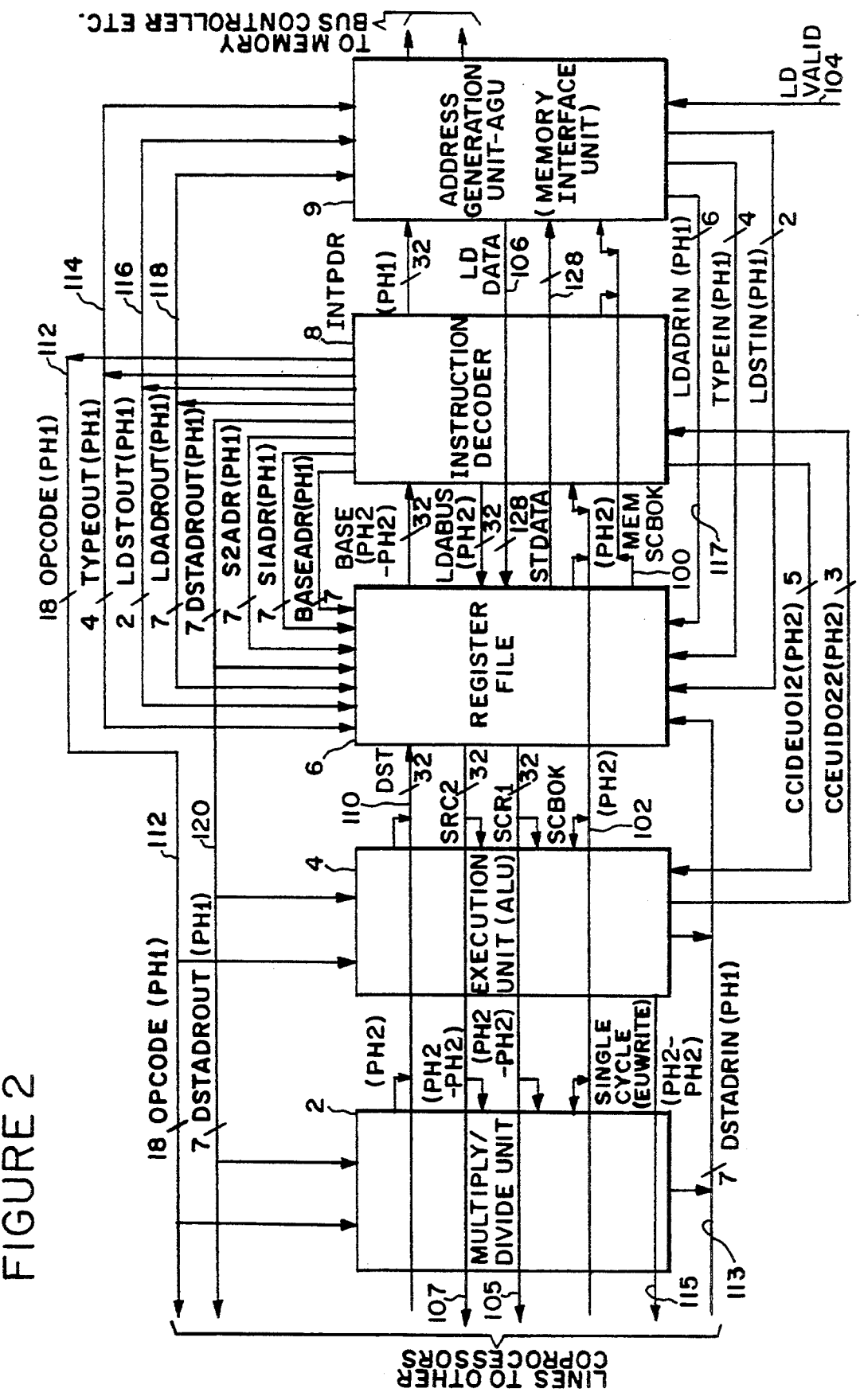
FIG. 2 is a more detailed block diagram of the components shown in FIG. 1.

As shown in FIG. 1 the microprocessor in which the present invention is embodied has five basic units that are described more fully in copending application Ser. No. 07/630,499. They include an instruction decoder (ID-8), a register file (RF-6), an execution unit (EU-4), a multiply/divide unit (MDU-2), and a memory interface unit (MIU-9).

In this specification, the term "functional units" is used to describe coprocessors that are concurrent processors of information provided by microinstructions issued by the instruction decoder (B). First types of functional units are capable of independently executing first microinstructions that take a plurality of clock cycles to complete execution. Second types of functional units are capable of independently executing second microinstructions that take a single clock cycle to complete execution.

The functional units receive instructions from the instruction decoder (ID-8) and operands from the Register File (RF-6), they compute some result or do some function, and they usually return some result to the Register File (RF-6).

The Multiply/Divide Unit (MDU-2) is an example of the first type of functional unit. It accepts instructions of the REG format. However, the MDU takes multiple cycles to complete its operation. It looks identical to an add in pipeline stage 0 and 1—in fact the ID and RF do not know the difference. When the instruction opcode matches a range that the MDU understands it takes the instruction and begins to work on it. During the beginning of pipe 2, clock phase 1 (denoted q21) the specified destination register in the register file is marked busy by setting its scoreboard bit to a one. The MDU's pipe stage 2, pipe 2, is its computational stage. It lasts multiple clocks. As it is computing this result other operations that do not need to use this result can be issued. This often allows part or all of the long operations to be hidden by other computations. When the MDU completes its work it returns the result to the Register File during Pipe 3. The MDU must arbitrate with other mutiple cycle functional units to use the destination bus that returns the result back to the register file. If it wins the arbitration it can write data back during the next destination bus cycle. The MDU will attempt to do this arbitration one clock before it completes its operation so it can return the results just as it completes the computation. It must also return a destination register specifier (113) to tell the RF where to put the result. It is the coprocessor that preforms the operation, not the register file, that keeps track of where the result goes.

Thus a typical coprocessor has 3 phases of operation as more fully decribed in application Ser. No. 07/630,499: 1) the issue or emitting phase—where resources are checked and sources are driven, 2) the computation phase, and 3) the return phase. There is a Pipe 0 stage also during which the ID gets the instruction, but the coprocessors are not concerned with this phase.

An example of the second type of coprocessor is the single-cycle coprocessor such as the Execution Unit (4). It both computes and returns the results during pipe stage 2. In order to help keep the single-cycle coprocessors as simple as possible, they never arbitrate for the return path to the Register File. They get access to the bus as long as none of their resources are scoreboarded, i.e. if the Scbok line (102) is asserted. Since only one operation can be emitted at a time on each of the three parts of the machine bus, there is never a collision between the single-cycle coprocessors. The multi-cycle coprocessors that want to return a result must first check the Euwrite line (115) to see if a single-cycle unit is going to use the return path. If so, the multi-cycle coprocessor must wait. If not, the multi-cycle coprocessor must arbitrate with the other multi-cycle coprocessors to see who gets to return the results. This arbitration is done one full clock before the data is actually returned to the RF. With this mechanism other single-cycle coprocessors can be added and work just as easily as the EU and take a single clock. Also as many multi-cycle coprocessors can be added as needed and only the arbitration logic needs to be changed—everything else is taken care of.

The coprocessors mentioned above are all REG (register) Format coprocessors—they execute on the REG portion of the machine bus. There are also MEM (memory) Format coprocessors that work off the MEM portion of the machine bus. They can be single or multi-cycle there also. A RAM is an example of a single-cycle coprocessor and a Bus controller is a multi-cycle one. A DMA (direct memory access) or MMU (memory management unit) are other examples of MEM coprocessors.

All of these coprocessors follow the same rules—the instructions they receive from the ID (8) are issued during q11, the resources are checked and the source operands are driven during q12, the resources used are marked busy during q21. They then either do the computation or complete the access requested. When this completes they must arbitrate among themselves to return the results to the Register File (except the single-cycle coprocessors who get to return their results without arbitration). Part of returning the results also includes returning the destination register address specifier so the RF knows where to put the result.

Since the RF does not have to maintain the destination register addresses, the number of coprocessors that can be added is not limited by the RF. Also since the RF does not track coprocessor operation, the coprocessor operation can take as many cycles as it needs and yet the RF continues to operate in parallel.

If a coprocessor that can only handle one instruction at a time is busy executing a previous instruction when a subsequent instruction request is made to it in q11 the coprocessor is responsible for noticing this collision. It responds by pulling the ScbOk signal low during q12 indicating that the resource needed for that instruction is busy.

This coprocessor mechanism is simple, clean, and extensible. For example, one could choose to implement four iterative multiplier coprocessor units on-chip, allowing up to four independent multiplies to be in progress. The system is still capable of executing loads, adds, etc. without waiting for any of these multiplies to finish. For certain applications that use several coprocessors and with a good optimizing compiler or good assembler code, the scoreboarding feature allows the system to, in some sense, emulate a data-flow architecture: data is fetched independently for several operations in parallel and as the data is received in the register file the associated operation is executed.

The euwrite signal (115) is part of each of the coprocessor's arbitration logic. Since all coprocessors must return results to the register file via the destination bus (110), the coprocessors must arbitrate for this bus. The EU unit is considered to be the highest priority coprocessor. As such the EU uses the destination bus when needed without waiting. The Euwrite signal is a principle part of the coprocessor arbitration scheme. The Euwrite signal is generated by the EU when it needs the destination bus and is broadcast to all other coprocessors to prevent them from using the bus at the same time. In general all other coprocessors that want to return results must wait for time slots wherein the EU is not using the bus.

All instructions to coprocessors are pipelined. The opcode (112) is broadcast by the ID to all coprocessors along with the destination operand's address during pipe 1, ph1. Both the opcode bus (112) and the Dstadrout (120) bus are precharged every ph2 and driven during ph1. This information is latched by all coprocessors. Instructions are decoded and source operands are driven (and held) onto the Src1/Src2 buses (105, 107) during pipe 1, ph2. During this pipestage Scbok (102) is also checked by the coprocessor (for example a coprocessor "A") which is to execute the instruction. If it is low it indicates that: (1) One or more of the resources needed to complete the instruction (ie. Src1, Src2, Dst registers) is not available because another instruction which is still executing is using that resource. In this case Scbok is pulled low by the RF. (2) Another single-cycle coprocessor (or example, a coprocessor "B") has faulted or requested an assist and pulls Scbok low. In this case coprocessor "B" pulls Scbok low to prevent other processors from using its result data which may be incorrect but may be used if needed by the next instruction.

If any one of the above cases occur the coprocessor is prohibited from continuing the execution of the present instruction—it leaves all state information unchanged and does not drive any of the address or data buses. If case 1 occurs the instruction is rescheduled by the ID and is rebroadcast at the next ph1. If case 2 occurs the ID jumps to a fault/assist routine.

Where a generic coprocessor may take an unlimited number of cycles to execute its instruction, the EU in all cases just requires I phase for instruction execution—pipe 2, ph1. The result of the operation is latched during the instruction execution phase and held through the following ph2 when the result is driven on the Dst bus.

Figure 3:
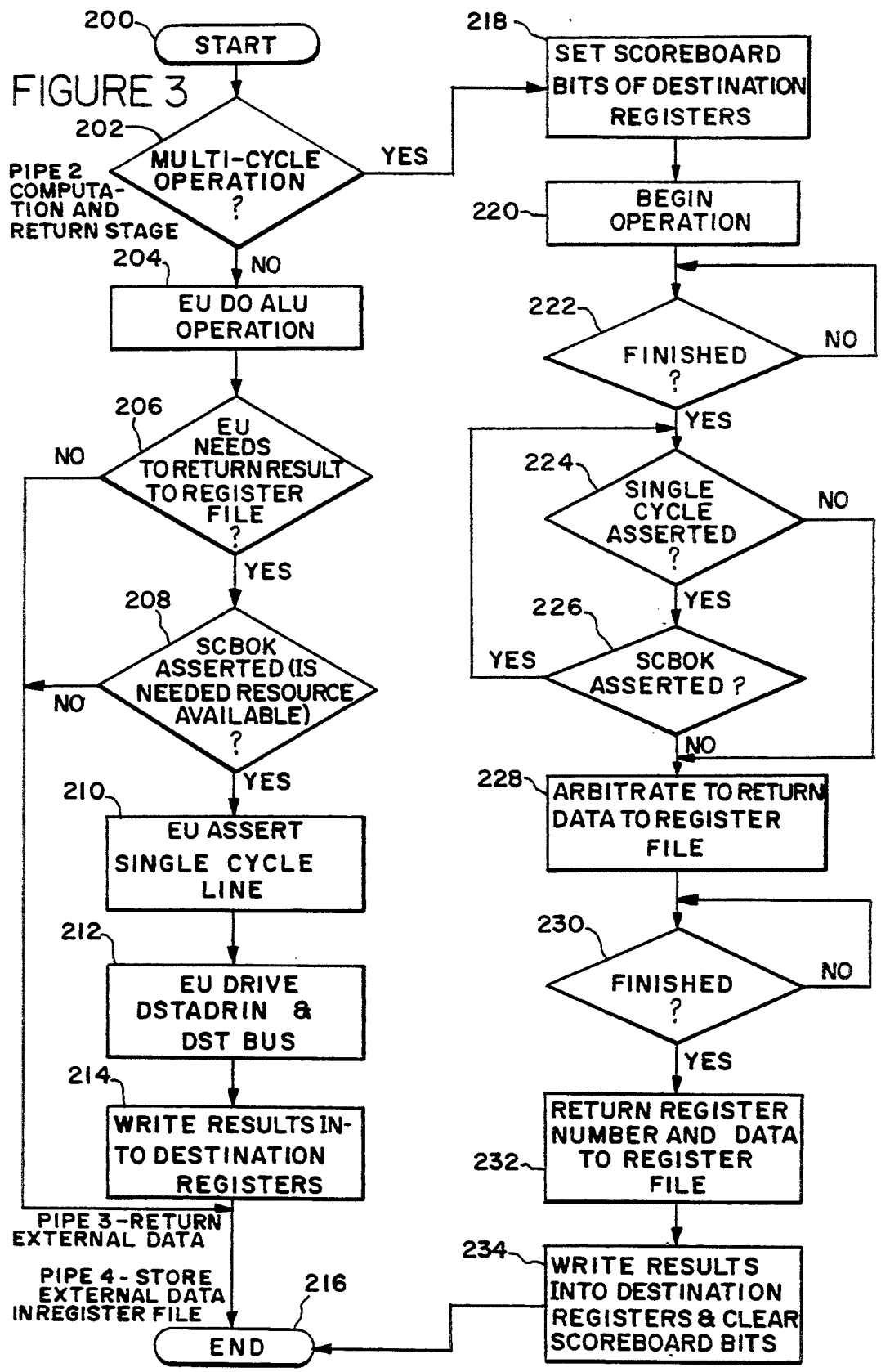
FIG. 3 is a flow chart of the method of operation of the microprocessor.

Refer now to FIG. 3 which is a flow diagram of pipe stage 2 pipe stage 3, and pipe stage 4. Pipe stage 0 and stage pipe 1 are described in copending application Ser. No. 07/630,499. During pipe 2, the computation and return stage; if it is a not multi-cycle operation (decision block 202), the EU (4) does the arithmetic logic unit ALU operations (204). When the EU needs to return a result to the RF, it checks to see if the needed resources are available by checking to see if the scbok line is asserted (decision block 206). If yes, the EU asserts the Euwrite line (210). The EU then drives the DSTADRIN and DST bus (212). The RF then writes (214) the results into the destination registers and the operation ends (216).

Thus, if the operation is a simple ALU type operation then the result is computed during q21 (block 204) and returned to the register file during q22 (block 214). As the data is written to the destination register the scoreboard bit is cleared marking the register available for use by another instruction.

The computation is begun and completed in one phase if it is a simple single-cycle ALU operation just described, i.e. the "no" path out of the multi-cycle operation decision block (200). If the operation is a long one, the "yes" path out of decision block (202), it takes more than 1 clock and the result or destination registers are marked as busy by setting the scoreboard bits (218). A subsequent operation needing that specific register resource will be delayed until this long operation is completed. This is called scoreboarding the register. There is one bit per 32-bit register called the scoreboard bit that is used to mark it busy if a long instruction. This scoreboard bit is checked during pipe 1, phase 2 (q12).

During the pipe 2 stage, the address is issued on the external address bus for loads and stores that go off-chip.

During the pipe 2 stage, the operation is begun (block 220). The Euwrite line is checked to see if it is asserted (decision block 214). If yes, the operation is prevented if scbok is asserted (block 226) as the EU is given access to the bus. If the euwrite line is not asserted or scbok line is not asserted then, during pipe 3, the coprocessors arbitrate for the bus (block 228). If granted the bus (230) and assuming zero wait states, during pipe 4 the data returns on the external data bus to the register file (232) from the bus controller.

Finally, during the pipe 4 stage, the bus controller sends this data to the RF and the register file writes the results into the destination registers and clears the scoreboard bits (block 234).

Figure 4:
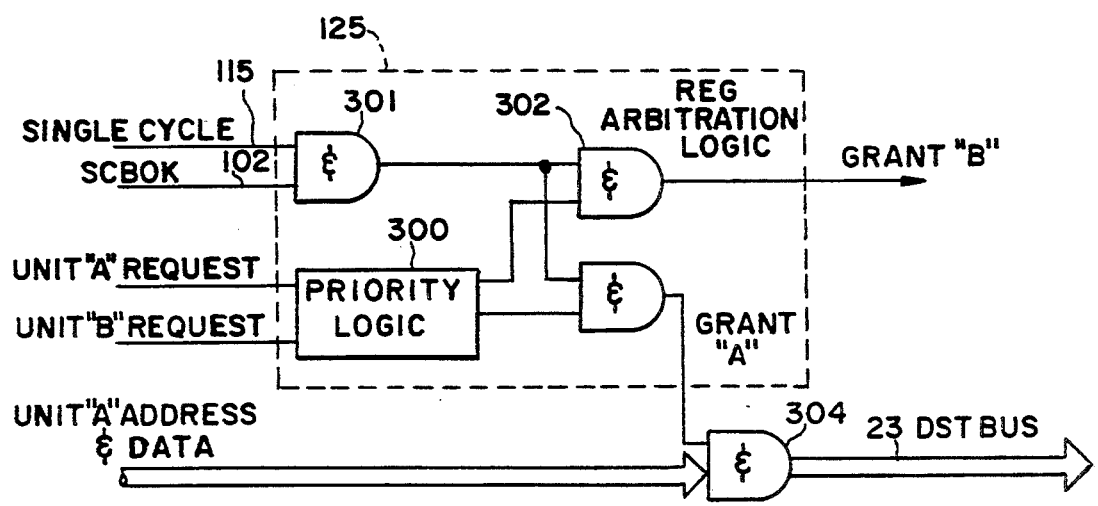
FIG. 4 is a logic diagram of the EU arbitration logic (4) of FIG. 1.
Figure 5:
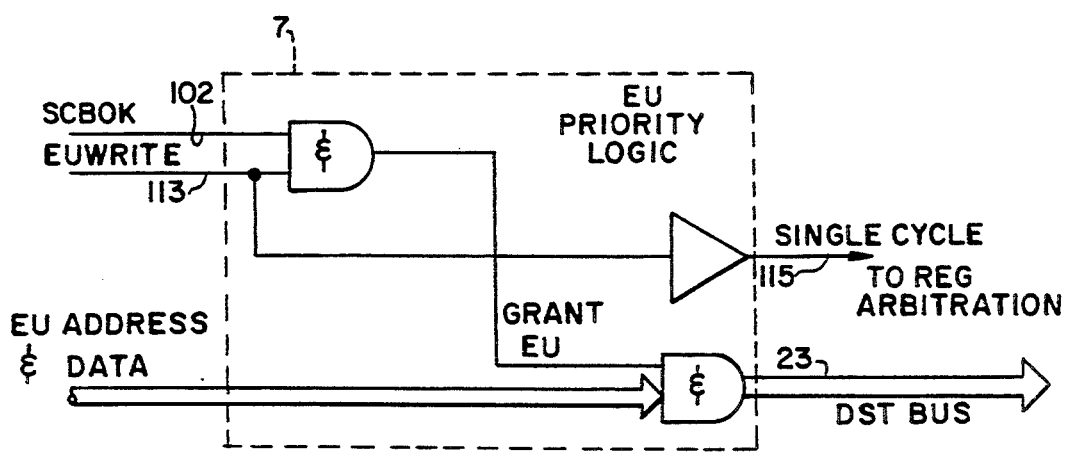
FIG. 5 is a logic diagram of the MDU arbitration logic (5) of FIG. 1.

Refer to FIGS. 4 and 5 which are logic diagrams of the EU arbitration logic (4) and the MDU arbitration logic (5) of FIG. 1. In general, coprocessors can hold results while they arbitrate among themselves for the Dstadrin bus (113) and Dst bus (110) to return a result. This is not true of the EU. The EU contains no hardware in which to hold results for more than a cycle. Thus, it must return the result during pipe 2, phi. To assure that it has access to the Dstadrin address bus and the Dst bus, the EU asserts the Euwrite line (115) on any operation which requires that EU return a result to a register, as shown in FIG. 5. The Euwrite line along with Scbok line indicate to other processors whether they can use the Dstadrin address bus during pipe 2, ph1 and the Dst bus during pipe 2, ph2. This is shown in FIG. 3 by decision blocks (224, 226). A coprocessor can drive the Dstadrin and Dst buses as long as both Euwrite and Scbok are not both high. If Euwrite is asserted, a yes is output from the decision block (124), and Scbok is not asserted, a no is output from decision block (126), then the coprocessors arbitrate to return data to the RF (228).

In the arbitration logic of the functional units, shown in FIG. 4, euwrite low and Scbok high indicates that the EU does not need the bus, and is the condition that lets another coprocessor to use the bus. Euwrite high and Scbok low indicates that although the EU intended to use the bus it was inhibited because of lack of a resource or because of another single-cycle coprocessor fault. In either case the EU will not use the Dstadrin bus nor the Dst bus during the next cycle; thus, it is free to be used by another coprocessor.

Each functional unit operates until it is done (222) and then arbitrates for the destination bus into the register file. When granted access to the bus, the unit returns a register specifier (232) which tells the register file where the data is supposed to return to, so the register file has an indication as to where the data is to be stored. The register file writes the results into the destination registers and clears the scoreboard bits (234).

The register file doesn't know, for example, that the multiply unit has G3 in it, and the floating point unit has G10 in it. The instructions are issued by the instruction decoder and it specifies what the result register is supposed to be. The register file examines the instruction and determines that, for example, the result register is G3, and it's a long operation, so it sets the scoreboard bit. On the next clock cycle an integer multiply that takes 4 clocks to complete is issued and then a floating point multiply that takes 4 clocks to complete is issued on the REG bus. For both operations the scoreboard bit is set. Now, if during the next two clocks simple ALU operations are issued that need only one clock each, they will immediately be granted access to the destination bus and will return their results. So four instructions have been issued on the bus. The last two have completed, the first two have not. When the first two operations finally do complete, they request the use of this return path into the register file. The scoreboard mechanism in the register file doesn't know what instructions are outstanding, it just remembers that it set some scoreboard bits. If some future instruction tries to use those invalid registers, it's trying to use data that hasn't been created yet, and the scoreboard mechanism prevents access to the register. The scoreboard mechanism guarantees that if an instruction later sequentially in the execution of the program needs to use the result of some operation that hasn't finished yet, the machine is stopped, whether it's a load, a floating point divide, multiply, or integer multiply/divide.

In the above example, a floating point multiply and integer multiply are outstanding. They haven't completed yet, but the next two instructions, for example, an integer add and an integer exclusive OR have finished, and they've returned the results in the register file and have completed. The next clock may see an integer compare being executed. The compare does not need to use the result path in the register file, because the compare doesn't produce a result into a register. So during that clock cycle, there is a free slot to use that return path into the register file. During that free clock the first instruction, the integer multiply, would finish right away. It puts in a request to use this return path into the register file, wins the arbitration and gets to return its data. As it's returning the data, it also returns the register specifier telling which register (register G3) the data is to go into. At the same time it indicates what length it is, one word, two words, etc. When units return their results, this clears the scoreboard bits associated with the destination registers specified, allowing other suspended operations to resume.

If during one particular clock phase, there is a simple integer operation such as an integer add, a floating multiply, and an integer multiply that all want to return simultaneously, there is an arbitration. Only one can return because there is only one write port on the REG side of the machine, so they have to arbitrate to get to return the results in an arbitrary order.

It's possible that there can be five or six operations on the REG side of the machine, that have not returned their results yet. There could be two or three in the floating point unit, two in the MDU and one in the execution unit. In order to simplify the arbitration mechanism, any of the simple arithmetic computations that take one clock will always win the arbitration. This allows the execution unit to avoid having a buffer to hold the results a variable number of cycles. If an execution unit instruction, such as an add, gets sent out, but it gets cancelled because one of its sources was scoreboarded, the return path is not occupied, so other functional units can use that cancelled return path. Suppose the add is waiting for a multiply to finish. If the logic were to allow this cancelled cycle to still consume the pipeline, then the machine would be deadlocked and the machine would never finish because the add would be waiting for the multiply, and the multiply couldn't return because it didn't have a free slot.

Sometimes a unit may want to go into arbitration one clock before it really needs to return results. Sometimes a unit is certain that it is going to be done because there could be some exceptional condition that may occur that takes an extra clock cycle, thereby delaying its need for access to the return path. At other times a unit will be certain that it needs the return path. To handle both situations, responses to two type of requests, "guess requests" and "regular requests" may be provided. These requests occur after the instructions have been issued and are on the REG interface.

For regular requests, there is a hard grant signal that says to the requesting unit, you are guaranteed to get to return your results during this clock cycle. If that happens, the unit gets to return its results in the following pipe stage clock. The grant comes back one clock before the unit really returns the data, so it is a pipeline request/grant mechanism.

For the guess requests there is a conditional grant from the arbitration logic. This says to a requesting unit that if the instruction being issued gets cancelled, this unit will get to return its data. An example is the case where the integer add is cancelled, and so the return slot is not used, so the arbitration logic lets some other unit use that return slot.

The protocol and the arbitration scheme in conjunction with the scoreboarding allows this multiple, multi-cycle operation to occur, as opposed to single cycle operation. It allows operations to return data out of order.

While the invention has been particularly shown and described with reference to preferred embodiments thereof, it will be understood by those skilled in the art that the foregoing and other changes in form and detail may be made therein without departing from the scope of the invention.

What is claimed is:

1. A microprocessor comprising:
    an instruction decoder (8);
    a register file (6);
    a plurality of first functional units for independently executing a plurality of first microinstructions that take a plurality of clock cycles to complete execution, said first microinstructions being issued by said instruction decoder;
    a plurality of second functional units for independently executing second microinstructions that take a single clock cycle to complete execution, said second microinstructions being issued by said instruction decoder;
    a microinstruction bus (112) connected to said instruction decoder, said register file, and to each of said first and second functional units;
    an interface;
    said instruction decoder being connected to said interface;
    a return bus (110) connected to said register file (6);
    a cancellation line (102) connected between said register file and each one of said first and second functional units;
    said register file including means for asserting said cancellation line upon a condition that a current microinstruction on said microinstruction bus (112) is valid;
    means in said register file for disasserting said cancellation line upon a condition that any one register in said register file is busy;
    a single cycle line connected from at least one of said single cycle functional units to said multiple cycle functional units;
    said multiple cycle functional units and said single cycle functional units being connected to said interface and to said return bus;
    said single cycle line being asserted by one of said single cycle functional units upon a condition that said single cycle functional unit requests access to said return bus; and,
    arbitration means connected to said single cycle line and to said cancellation line for preventing access to said return bus upon a condition that said single cycle line and said cancellation line are asserted.

2. The microprocessor in accordance with claim 1 further comprising:
    arbitration means for arbitrating requests by each of said multiple cycle functional units;
    said arbitration means including means for granting a request upon a condition that said single cycle line is not asserted; and,
    means connected to said arbitration means for returning data and a register specifier to said register file in response to said arbitration means granting said request.

3. The microprocessor in accordance with claim 1 further comprising:
    arbitration means for arbitrating requests by each of said multiple cycle functional units;
    said arbitration means including means for granting a request upon a condition that said single cycle line is asserted and said single cycle line is not asserted; and,
    means connected to said arbitration means for returning data and a register specifier to said register file in response to said arbitration means granting said request.

4. In a pipelined microprocessor which includes
    an instruction decoder (8),
    a REG interface (23),
    a MEM interface (33),
    a register file (6) of registers including destination registers,
    a plurality of first functional units for independently executing first microinstructions that take a plurality of clock cycles to complete execution, said first microinstructions being issued by said instruction decoder;
    a plurality of second functional units for independently executing second microinstructions that take a single clock cycle to complete execution, said second microinstructions being issued by said instruction decoder; and, a microinstruction bus (112) connected to said instruction decoder, said register file, and to each of said first and second functional units;

a single cycle line (102) connected from at least one of said single cycle functional units to said multiple cycle functional units;

a method comprising the steps of:

(A) connecting a Scbok line (102) between said instruction decoder, said register file and to each one of said first and second functional units;

(B) asserting said Scbok line upon a condition that a current microinstruction on said microinstruction bus (112) is valid;

(C) disasserting said Scbok signal upon a condition that any one register in said register file needed by said current instruction on said microinstruction bus is busy;

(D) asserting said single cycle line (102) upon a condition that said single cycle functional unit requests access to said destination bus; and, (E) preventing access to said destination bus upon a condition that said single cycle line and said ScbOk line are asserted.

5. The method in accordance with claim 4 comprising the further steps of:

(F) (G) arbitrating requests by each of said multiple cycle functional units;

(G) (H) granting a request upon a condition that said single cycle line is not asserted; and, (H) (I) returning data and a register specifier to said register file in response to said arbitrating means granting said request.

6. The method in accordance with claim 4 comprising the further steps of:

(G) arbitrating requests by each of said multiple cycle functional units;

(H) granting a request upon the condition that said single cycle line is asserted and said scbok line is not asserted; and, (H) returning data and a register specifier to said register file in response to said arbitrating means granting said request.

7. A microprocessor comprising:

an instruction decoder (8);

a register file (6);

a plurality of first functional units for independently executing a plurality of first microinstructions that take a plurality of clock cycles to complete execution, said first microinstructions being issued by said instruction decoder;

a plurality of second functional units for independently executing second microinstructions that take a single clock cycle to complete execution;

a microinstruction bus (112) connected to said instruction decoder, said register file, and to each of said first and second functional units;

a REG interface;

said instruction decoder being connected to said REG interface;

a destination bus (110) connected to said register file (6);

a Scbok line (102) connected between said instruction decoder, said register file and to each one of said first and second functional units;

said instruction decoder including first logic for asserting said Scbok line upon a condition that a current microinstruction on said microinstruction bus (112) is valid;

a second logic in said register file for disasserting said Scbok signal upon a condition that any one register in said register file needed by an instruction on said microinstruction bus is busy;

a single cycle line (102) connected from at least one of said single cycle functional units to said multiple cycle functional units;

said single cycle line being asserted by one of said single cycle functional units upon a condition that said single cycle functional unit requests access to said destination bus;

said multiple cycle functional units and single cycle functional units being connected to said REG interface and to said destination bus; and, an arbitration logic connected to said single cycle line and to said ScbOk line for preventing access to said destination bus upon a condition that said single cycle line and said ScbOk line are asserted.

8. In a data processor connected to a main memory and a microinstruction bus for carrying a current microinstruction including an opcode field, said data processor including single cycle coprocessors and multi-cycle processors;

an instruction decoder;

a register file comprised of a plurality of registers;

said register file including busy bits associated with each register in said register file;

a cancellation line connected to said register file and to first ones of said single cycle coprocessors and multi-cycle processors, said cancellation line when driven to a first state, indicating that a first particular register of said plurality of registers or a single cycle coprocessor or a multi-cycle processor used by a current register type of microinstruction on said microinstruction bus is available for a register execution operation and, when driven to a second state, indicating that said first particular register or said single cycle coprocessor or said multi-cycle processor used by said current register type of microinstruction on said microinstruction bus is not available for a register execution operation;

said cancellation line being initially driven to said first state;

first means connected to said register file for checking said first particular register needed to execute said microinstruction to determine if said first particular register is busy;

second means connected to said microinstruction bus for checking said opcode field of said microinstruction to determine if said microinstruction is a single cycle microinstruction, third means connected to said first means, said second means, and to said cancellation line, for driving said cancellation line to said second state upon a condition that said microinstruction is a single cycle microinstruction and that said first particular register needed by said single cycle microinstruction is busy;

a return bus connected to said register file;

a single cycle line connected from at one of said single cycle processors to said multiple cycle processors;

said single cycle line being asserted by one of said single cycle processors upon a condition that said one of said single cycle processors requests access to said return bus;

said multiple cycle processors and single cycle processors being connected to said interface and to said return bus; and, arbitration means connected to said single cycle line and to said cancellation line for preventing access to said return bus upon a condition that said single cycle line and said cancellation line are asserted.

9. The microprocessor in accordance with claim 8 wherein said arbitration means includes means for granting a request upon a condition that said single cycle line is not asserted; and, means for returning data and a register specifier to said register file said condition that said single cycle line is not asserted.

10. A data processor connected to a main memory and a microinstruction bus for carrying a current microinstruction, said current microinstruction including source operands, said data processor including a register file comprised of a plurality of registers including destination registers; said register file including busy bits associated with each register in said register file; an instruction decoder;

a REG interface;

a MEM interface;

a plurality of first processors for independently executing first microinstructions that take a plurality of clock cycles to complete execution, said first microinstructions being issued by said instruction decoder;

a plurality of second processors for independently executing second microinstructions that take a single clock cycle to complete execution, said second microinstructions being issued by said instruction decoder;

a microinstruction bus connected to said instruction decoder, said register file, and to each of said first and second processors;

a cancellation line connected between said instruction decoder, said register file and to each one of said first and second processors;

a single cycle line connected from at least one of said single cycle processors to said multiple cycle processors;

a method comprising the steps of:

(A) driving said cancellation line to a first state to signal that said current microinstruction on said microinstruction bus is valid;

(B) driving information from said register file on a machine bus during a first phase of a first clock cycle;

(C) reading said source operands of said current microinstruction during a second phase of said first clock cycle;

(D) checking said busy bits of all registers needed by said source operands to execute said current microinstruction register file;

(E) driving said cancellation line to a second state during said second phase of said first clock cycle upon a condition that any one of said registers needed by said microinstruction is marked busy or a single cycle coprocessor or a multi-cycle processor used by a current register type of microinstruction on said microinstruction bus is unavailable for a register execution operation;

(F) reissuing said current microinstruction during a clock cycle subsequent to said first clock cycle upon a condition that said cancellation line is driven to said second state;

(G) asserting said cancellation line to signal that a current microinstruction on said microinstruction bus is valid;

(H) disasserting said cancellation signal upon a condition that any one register in said register file needed by the instruction on said microinstruction bus is busy;

(I) asserting said single cycle line upon a condition that one of said second processors requests access to said destination bus; and, (J) preventing access to said destination bus upon a condition that said single cycle line and said cancellation line are asserted.

11. The method in accordance with claim 10 comprising the further steps of:

(K) arbitrating requests by each of said second processors upon a condition that said single cycle line is not asserted; and, (L) returning data and a register specifier to said register file.

12. A data processor connected to a main memory and a microinstruction bus for carrying a current microinstruction, said current microinstruction including an opcode field, said data processor including:

a register file comprised of a plurality of registers;

said register file including scoreboard bits associated with each of said plurality of registers in said register file, In a pipelined microprocessor which includes an instruction decoder;

a REG interface;

a MEM interface;

said register file including destination registers;

a plurality of first functional units for independently executing first microinstructions that take a plurality of clock cycles to complete execution, said first microinstructions being issued by said instruction decoder;

a plurality of second functional units for independently executing second microinstructions that take a single clock cycle to complete execution, said second microinstructions being issued by said instruction decoder;

and, a microinstruction bus connected to said instruction decoder, said register file, and to each of said first and second functional units;

a single cycle line connected from at least one of said single cycle functional units to said multiple cycle functional units;

a Scbok line connected between said instruction decoder, said register file and to each one of said first and second functional units;

a method comprising the steps of:

A. driving said Scbok line to a first state to indicate that a register or a single cycle or multi-cycle coprocessor used by a current register type of microinstruction on said microinstruction bus is available for a register execution operation;

B. checking said busy bits of all registers needed to execute said microinstruction to determine if they are all available;

C. checking said opcode field of said microinstruction to determine if said microinstruction is a single cycle microinstruction or a multi-cycle microinstruction, D. driving said Scbok line to a second state upon a condition that said microinstruction is a single cycle and that a register or a single cycle coprocessor or a multi-cycle processor needed by said microinstruction is busy;

(E) asserting said Scbok line to signal that a current microinstruction on said microinstruction bus is valid;

(F) disasserting said Scbok signal upon a condition that any one register in said register file needed by the instruction on said microinstruction bus is busy;

(G) asserting said single cycle line upon a condition that said single cycle functional unit requests access to said destination bus; and, (H) preventing access to said destination bus upon a condition that said single cycle line and said ScbOk line are asserted.

13. The method in accordance with claim 12 comprising the further steps of:

(I) arbitrating requests by each of said multiple cycle functional units upon a condition that said single cycle line is not asserted; and, (J) returning data and a register specifier to said register file.

* * * * *

UNITED STATES PATENT AND TRADEMARK OFFICE
CERTIFICATE OF CORRECTION

PATENT NO. : 5,428,811

DATED : June 27, 1995

INVENTOR(S) : Hinton et al.

It is certified that error appears in the above-indentified patent and that said Letters Patent is hereby corrected as shown below:

Column 7, line 40, change "phi" to --ph1 --

Signed and Sealed this

Sixteenth Day of April, 1996

Attest:

BRUCE LEHMAN

Attesting Officer

Commissioner of Patents and Trademarks